PROCESS FOR PREPARATION OF DIALKYL PHOSPHONATES

Filed Sept. 14, 1965

FIG. 2 DETAIL

INVENTOR.
H.E. SORSTOKKE
BY Louis D. Kling, Jr.
ATTORNEY.

United States Patent Office 3,420,921
Patented Jan. 7, 1969

1

3,420,921
PROCESS FOR PREPARATION OF DIALKYL PHOSPHONATES

Harold E. Sorstokke, New City, N.Y., assignor to Stauffer Chemical Company, a corporation of Delaware Filed Sept. 14, 1965, Ser. No. 487,215
U.S. Cl. 260—976 5 Claims
Int. Cl. C07f 9/08

ABSTRACT OF THE DISCLOSURE

A process for producing a dialkyl phosphonate by the reaction of phosphorus trichloride and a monohydric alkanol of from 1 to 4 carbon atoms, which comprises prior to the initiation of the reaction, saturating the alkanol with hydrogen chloride.

Figure 1:
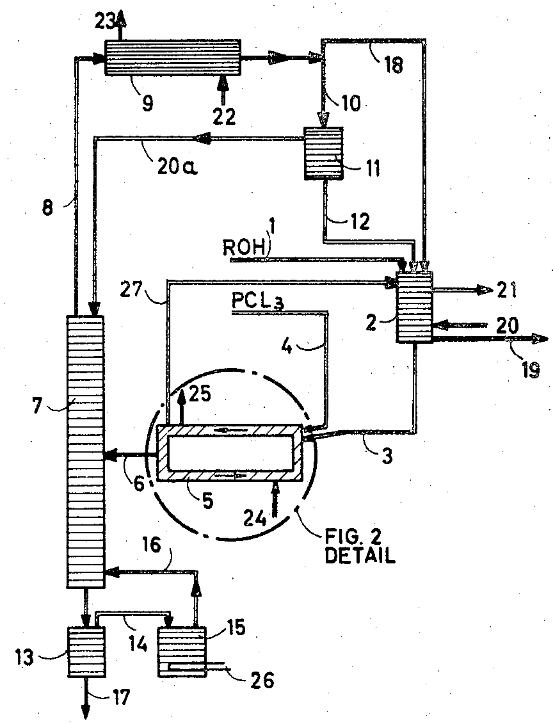
Figure 1:
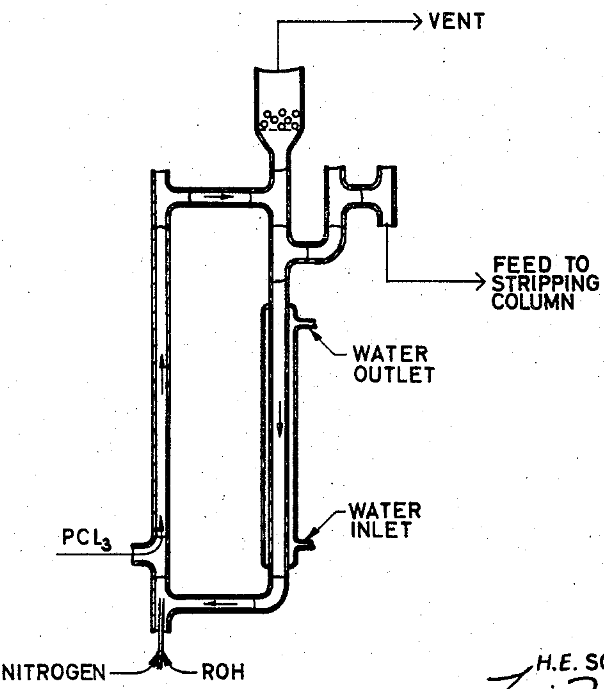

This invention relates to a novel process for the preparation of dialkyl phosphonates. More particularly, this invention relates to a process for preparing lower dialkyl phosphonates of the formula,

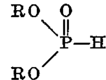

wherein the groups represented by R are lower alkyl having from 1 to 4 carbon atoms.

Dialkyl phosphonates which are well known compounds, are useful as intermediates for the preparation of flameproofing agents, insecticides, antioxidants, etc., and are prepared by a number of methods; most of which are somewhat unsatisfactory. The basic process involves reacting 3 moles of an aliphatic alcohol with phosphorus trichloride. From the pot-type reactor where the difficulty of controlling the temperature resulted in decomposition of the product and consequent low yields; the art has progressed to a continuous process wherein the phosphorus trichloride is reacted with an alcohol in the presence of an inert organic refrigerant (Chadwick, U.S. Patent 2,582,817, issued Jan. 15, 1962); to the Gann et al. process, wherein the phosphorus trichloride and alcohol are reacted in the presence of a boiling and refluxing hydrocarbon solvent (U.S. Patent 2,692,890), issued Oct. 26, 1954); and finally to the Campbell process wherein the reaction is accomplished without the aid of a solvent (U.S. Patent 2,794,820, issued June 4, 1957). All of these prior art processes have been directed primarily to the problem of controlling reaction temperatures and retention times in order to inhibit any reaction between the dialkyl phosphonate product and the hydrochloric acid by-product. The relative success thus far achieved in controlling these variables has usually gone hand in hand with high costs and complicated equipment. Especially troublesome to manufacture are the lower dialkyl phosphonates which because of their affinity for the hydrochloric acid by-product, pose difficult problems of isolation and purification.

An object of this invention is to provide a continuous process for preparing dialkyl phosphonates from phosphorus trihalides and monohydric alcohols wherein a less expensive and more efficient control of the reaction heat is attained.

Another object of this invention is to provide a continuous process for preparing dialkyl phosphonates from phosphorus trihalides and monohydric alcohols wherein the hydrochloric acid by-product is prevented from reacting with the dialkyl phosphonate product.

A further object of this invention is to provide a continuous process for producing dialkyl phosphonates from phosphorus trihalides and monohydric alcohols which is suitable for commercial production and which uses relatively simple and less expensive equipment.

2

Other objects of the invention will be apparent from the detailed explanation which follows.

I have now discovered that the aforementioned problems of the art can be avoided or reduced and other benefits achieved by presaturating the alcohol with hydrogen chloride prior to reaction with the phosphorus trichloride. This departure from processes as heretofore practiced eliminates the large amount of heat normally generated due to the saturation of the alcohol by the release of the hydrogen chloride by-product. Thus the heat of reaction is dissipated by the immediate evolution of hydrogen chloride gas upon initiation of the reaction. The cooling effect produced by the evolution of hydrogen chloride enables one to use smaller reactors since a large heat transfer area is no longer required; and an additional advantage is that little or no cooling is required at the reactor. Where cooling is required, simple water will suffice in place of the more expensive brine. The smaller reactor permitted by this process and consequent reduced volume, enables one to complete the reaction quicker while operating at higher temperatures than were previously possible yet avoiding any substantial reaction of the hydrochloric acid with the dialkyl phosphonate product.

In a preferred aspect of the invention a thermosiphon reactor is employed. This reactor consists of a closed loop with a disengaging chamber at the top for the escape of hydrogen chloride gas bubbles, an overflow leg for passing the reaction product to the stripping column and a heat exchanger in one of the legs to provide a small amount of cooling. The evolution of hydrogen chloride induces circulation in the closed loop by causing a change in density between the opposite legs of the reactor. It is also desirable to add an inert gas such as nitrogen to insure a steady flow in the reactor.

The reaction occurring may be written as follows:

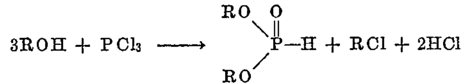

wherein the groups represented by R are lower alkyl having from 1 to 4 carbons. Examples of suitable alcohols which may be used in this process are the following: ethanol, n-propanol, iso-propanol, n-butanol and iso-butanol; which should be substantially anhydrous to achieve high yields of product.

A working temperature range for the reaction is between about −20° C. and about 80° C. so as not to cause decomposition of the product or require an excessively long reaction time. The preferred temperature range is between 0° C. and 45° C. The temperature of the hydrogen chloride saturated alcohol feed may be maintained by simple water cooling between about 25° C. and 30° C. enabling one, when the temperature is maintained below the upper limit, to conduct the reaction without cooling the reactor except when methanol is a reactant, and again water cooling will be adequate.

After the almost instantaneous reaction is complete the reactants will be passed to a stripping column. In a preferred aspect of the invention, a continuous process is used wherein a thermosiphon reactor of the type previously referred to forces the reaction products to overflow into the stripping column. This column will preferably be a fractionating column in which an inert solvent is constantly refluxing under conditions which cause the separation of the desired product from the by-products and excess reactants. The ideal solvent is one which is completely inert with respect to the reactants and by-products; is low boiling to the extent that it is easily separated from the dialkyl phosphonate product; forms an azeotropic mixture with the excess alcohol, alkyl chloride, and hydrogen chloride driven off; and is immiscible with the hydrogen chloride saturated excess alcohol after condensation of the azeotrope vapors. Although it is not essential as regards product quality that the inert solvent be both an azeotrope former and immiscible with the volatiles after condensation, it is preferable from a processing standpoint. The principal value in the use of an azeotrope former is that the azeotrope generally boils at a lower temperature which consequently lowers the cost of the process. Among the inert solvents which we have found suitable for use in our invention are toluene, which forms suitable azeotropes with methanol, ethanol, propanol and sec-butanol; hexane, which forms suitable azeotropes with methanol and ethanol; xylene, which forms suitable azeotropes with n- and iso-butanol; benzene, which forms suitable azeotropes with methanol, ethanol, iso-propanol, and tert-butanol, and chlorbenzene which forms azeotropes with n-propanol, n-butanol and iso-butanol. After leaving the fractionating column, the azeotropes will preferably enter a condenser where the alcohol and inert solvent vapors are condensed and then passed to a separator. Here the inert solvent may be separated to be returned to a fractionating column. The excess alcohol saturated with hydrogen chloride may be passed through an absorber where fresh feed alcohol is introduced and where all the alcohol becomes hydrogen chloride saturated. The saturated alcohol may then be mixed with the phosphorus trichloride feed in the reactor.

Referring now to FIGURE 1, my invention may be described in a preferred embodiment as follows:

A stoichiometric amount of alcohol is introduced through conduit 1 and passed to absorber 2 where the alcohol is saturated with hydrogen chloride emitted from the reaction, as hereinafter explained. A cooling liquid (i.e., water) enters the cooling jacket of the absorber through conduit 20 and leaves by conduit 21. The saturated alcohol is conveyed from the absorber through conduit 3 to reactor 5 where it is mixed with phosphorus trichloride entering from conduit 4 and a small amount of an inert gas such as nitrogen is passed to the thermosiphon reactor from a separate line (not shown) to aid circulation. Hydrogen chloride vapors emitted immediately upon reaction escape through conduit 27 and are passed to absorber 2. If required, the temperature of the charge may be controlled by means of a cooling liquid (i.e., water) entering the cooling jacket through conduit 24 and leaving through conduit 25. Since the reaction takes places under adiabatic or nearly adiabatic conditions, very little or no cooling is required as the temperature of the charge will not rise appreciably above that of the saturated alcohol feed. After the reaction is complete the reaction mixture is passed through conduit 6 into fractionating column 7. In column 7 an inert solvent is continuously refluxing under conditions such that the lower boiling hydrogen chloride, alkyl chloride, inert solvent, and excess alcohol are passed out through the top of the column while the higher boiling point dialkyl phosphonate is separated and passes to the bottom of the column. The former lower boiling mixture passes out of the column through conduit 8 into condenser 9. This condenser is to recover the excess alcohol and inert solvent and is cooled by means of a cooling liquid entering the cooling jacket at conduit 22 and leaving through conduit 23. The hydrogen chloride and alkyl chloride escape through conduit 18 to absorber 2. The excess alcohol and solvent are passed through conduit 10 to separator 11. The separator has two outlets, the upper outlet returns the lighter solvent to the fractionating column through conduit 20(*a*) whereas the heavier hydrogen chloride saturated alcohol is passed from the lower outlet through conduit 12 to absorber 2. Due to the excess of hydrogen chloride, the alcohol feed entering from conduit 1 also becomes hydrogen chloride saturated. The remainder of hydrogen chloride and the alkyl chloride are removed through conduit 19 to be discarded or recovered. Returning to fractionating column 7, the higher boiling dialkyl phosphonate product is separated, and passes to the bottom of the column and into separator 13. A small amount of inert solvent is present which passes out of the upper outlet of the separator through conduit 14 to reboiler 15, where the solvent is boiled off through conduit 16 and returned to the column. Heat is applied to the reboiler at heater 26. The dialkyl phosphonate product passes out of the lower outlet of the separator through line 17 to be stored for batch distillation.

Referring now to FIGURE 2, reactor 5 is shown in detail. The $PCl_3$ and alcohol are reacted in the left leg of the reactor forming the dialkyl phosphonate and the hydrogen chloride-dialkyl chloride by-products. These gaseous by-products, by creating a difference in density between the two legs of the reactor, cause the liquid to circulate rapidly in a clockwise direction; said circulation aided also by the addition of nitrogen in the left leg. The gaseous by-products are then removed through a vented packed section at the upper right hand corner which section serves to separate the entrained dialkyl phosphonate. Cooling water is supplied at the jacketed section on the right side of the thermosiphon and the dialkyl phosphonate product leaves the reactor through the over-flow leg and enters the stripping column.

The following examples which are illustrative of the invention should not be construed as limiting the invention in any way:

Example 1

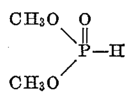

To a thermosiphon reactor of the type previously described were charged 25 parts per hour (0.18 mole) of phosphorus trichloride and 17.5 parts per hour (0.54 mole) of methanol saturated with hydrogen chloride. The temperature of the reaction was maintained at about 15° C. by water cooling and the average retention time in the reactor was approximately 30 minutes. The hydrogen chloride gas evolved was passed to an alcohol-hydrogen chloride absorber, and the reaction products were allowed to overflow into a fractionating column where refluxing hexane was used to separate the low boiling volatiles from the dimethylphosphonate product. This crude product which passed downward from the column into a reboiler was separated from the hexane solvent in a decanter, and batch distilled to give 16.1 parts per hour (0.15 mole) of dimethylphosphonate for an average yield of 81.5% based on the phosphorus trichloride.

Example 2

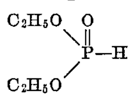

To a thermosiphon reactor of the type previously described, were charged 5.6 parts per hour (0.04 mole) of phosphorus trichloride and 6.2 parts per hour (0.14 mole) of ethanol saturated with HCl. The temperature of the reaction was maintained between 19° C. and 43° C. without any cooling and the average retention time in the reactor was approximately one hour. The hydrogen chloride evolved was passed through an alcohol-hydrogen chloride absorber, and the reaction products were allowed to overflow into a fractionating column where refluxing hexane was used to separate the low boiling volatiles from the diethylphosphonate product. This crude product which passed downward from the column into a reboiler was separated from the hexane solvent in a decanter, and batch distilled to give 5.5 parts per hour (0.039 mole) of diethylphosphonate for an average yield of 97.6% based on the phosphorus trichloride having a purity of 99.8%.

From the foregoing detailed description and examples it will be apparent to one skilled in the art that obvious variations and modifications can be made without departing from the true spirit and scope of the invention.

I claim:

1. In the process for producing a dialkyl phosphonate by the reaction of phosphorus trichloride and a monohydric alkanol having from 1 to 4 carbon atoms, the improvement which comprises saturating said alkanol with hydrogen chloride prior to the initiation of the reaction.

2. The process of claim 1 wherein the reaction temperature is maintained from about —20° C. to about 80° C.

3. The process of claim 1 wherein the reaction temperature is maintained from 0° C. to 45° C.

4. In the process for producing dimethylphosphonate by the reaction of phosphorus trichloride and methanol, the improvement which comprises saturating said methanol with hydrogen chloride prior to the initiation of the reaction.

5. In the process for producing diethylphosphonate by the reaction of phosphorus trichloride and ethanol the improvement which comprises saturating said ethanol with hydrogen chloride prior to the initiation of the reaction.

No references cited.

CHARLES B. PARKER, *Primary Examiner.*

A. H. SUTTO, *Assistant Examiner.*

U.S. Cl. X.R.

202—176; 260—961

Disclaimer 3,420,921.—*Harold E. Sorstokke*, New City, N.Y. PROCESS FOR PREPARATION OF DIALKYL PHOSPHONATES. Patent dated Jan. 7, 1969. Disclaimer filed July 3, 1969, by the assignee, *Stauffer Chemical Company*.

Hereby enters this disclaimer to claims 1, 2, 3, 4 and 5 of said patent.

[*Official Gazette August 12, 1969.*]